US010234882B2

(12) United States Patent
Florin

(10) Patent No.: US 10,234,882 B2
(45) Date of Patent: Mar. 19, 2019

(54) ELECTRICAL FUNCTION GROUP

(71) Applicant: KROHNE Messtechnik GmbH, Duisburg (DE)

(72) Inventor: Wilhelm Florin, Duisburg (DE)

(73) Assignee: KROHNE MESSTECHNIK GMBH, Duisburg (DE)

(*) Notice: Subject to any disclaimer, the term of this patent is extended or adjusted under 35 U.S.C. 154(b) by 0 days.

(21) Appl. No.: 15/860,998

(22) Filed: Jan. 3, 2018

(65) Prior Publication Data
US 2018/0188755 A1 Jul. 5, 2018

(30) Foreign Application Priority Data

Jan. 4, 2017 (DE) .................. 10 2017 100 125

(51) Int. Cl.
G05F 1/575 (2006.01)
G05F 1/567 (2006.01)
H02M 1/08 (2006.01)
H02M 3/158 (2006.01)
G05F 1/563 (2006.01)
G05F 1/571 (2006.01)
(Continued)

(52) U.S. Cl.
CPC ............. G05F 1/575 (2013.01); G05F 1/563 (2013.01); G05F 1/567 (2013.01); G05F 1/571 (2013.01); H02M 1/08 (2013.01); H02M 3/158 (2013.01); G05F 1/565 (2013.01); G05F 1/577 (2013.01); G05F 1/595 (2013.01); H02M 2001/008 (2013.01); H02M 2001/009 (2013.01)

(58) Field of Classification Search
CPC .......... G05F 1/565; G05F 1/575; G05F 1/577; G05F 1/595; H02M 2001/008; H02M 2001/009
USPC .................. 323/267, 270, 271, 275–277, 285
See application file for complete search history.

(56) References Cited

U.S. PATENT DOCUMENTS 8,810,220 B2 * 8/2014 Bai .......................... H04R 1/04
323/277
2007/0096707 A1 * 5/2007 Xi ........................ H02M 3/158
323/283
(Continued)

FOREIGN PATENT DOCUMENTS

DE         102 20 276 A1      12/2002
DE      10 2006 038 158 A1     2/2008
DE      10 2015 211 028 B3     8/2016

Primary Examiner — Gary A Nash
(74) Attorney, Agent, or Firm — David S. Safran; Roberts Mlotkowski Safran Cole & Calderon, P.C.

(57) ABSTRACT

An electrical function group with a control device and a first voltage regulator, the control device having a supply voltage input, the first voltage regulator having a first supply voltage input and a first supply voltage output and being designed for connection to a supply voltage source via the first supply voltage input and to supply the control device via the first supply voltage output, the first supply voltage output and the supply voltage input being connected together. A second voltage regulator is also provided having a second supply voltage input and a second supply voltage output, the second voltage regulator being designed to be connected to the supply voltage source via the second supply voltage input and to supply the first voltage regulator and the control device via the second supply voltage output, the second supply voltage output and the first supply voltage input being connected to one another.

11 Claims, 2 Drawing Sheets

(51) Int. Cl.
    *G05F 1/577*   (2006.01)
    *G05F 1/565*   (2006.01)
    *H02M 1/00*    (2006.01)
    *G05F 1/595*   (2006.01)

(56) References Cited

U.S. PATENT DOCUMENTS

| | | | |
|---|---|---|---|
| 2007/0217238 A1* | 9/2007 | Kanayama | H02M 3/155 363/125 |
| 2009/0002901 A1* | 1/2009 | Matsumoto | H03K 17/08122 361/18 |
| 2011/0031946 A1* | 2/2011 | Egan | G05F 1/563 323/266 |
| 2012/0001602 A1 | 1/2012 | Egan et al. | |
| 2015/0061544 A1* | 3/2015 | Hamanaka | H05B 33/0815 315/307 |

\* cited by examiner

ELECTRICAL FUNCTION GROUP

BACKGROUND OF THE INVENTION

Field of the Invention

The invention relates to an electrical function group with a control device and a first voltage regulator. Thereby, the control device has a supply voltage input and the first voltage regulator has a first supply voltage input as well as a first supply voltage output. Further, the first voltage regulator is designed to be connected to a supply voltage source via the first supply voltage input and to supply the control device via the first supply voltage output. The first supply voltage output of the first voltage regulator and the supply voltage input of the control device are connected to one another.

Furthermore, the invention relates to a measuring device having at least one electrical function group of the described type.

Description of Related Art

A measuring device of the type to which the invention is directed may be, for example, a flow, level, temperature, pressure, analysis, gas or steam measuring device. The measuring device is preferably designed as a field device. A field device is a technical device of process automation and usually an actuator or a sensor or a combination of an actuator and a sensor. Actuators are, for example, control members and valves and sensors are, for example, the aforementioned measuring instruments. Field devices usually have an interface for a field bus and are designed for communication with a control system.

An electrical function group is designed to carry out at least one function and/or one task during operation. The control device of the electrical function group is designed to control the execution of the function and/or the task. Often, the control device has a microcontroller for this. For operation, the control device requires the supply of electrical power via the supply voltage input. To ensure safe operation of the control device, a voltage present at the supply voltage input when supplying the electrical power must be within a supply voltage range.

Since an electric power provided by the supply voltage source is often accompanied by a voltage that is outside the supply voltage range of the control device, the electrical function group has the first voltage regulator. A voltage regulator, such as the first voltage regulator, has a supply voltage input and a supply voltage output. During operation, the voltage regulator generates an output voltage present at the supply voltage output, wherein the output voltage is constant in the scope of the technical possibilities and, thus, independent both from an input voltage present at the supply voltage input and from an electrical load connected to the supply voltage output, such as the electrical function group. For operation, the voltage regulator requires the supply of electrical power via the supply voltage input. To ensure safe operation of the voltage regulator, the input voltage present at the supply voltage input when the electrical power is supplied must be within a supply voltage range. The voltage regulator also has to be provided with the electrical power required by the load for operation via the first supply voltage input. The first voltage regulator is thereby designed to supply the control device with electrical power such that it generates a first supply voltage within the supply voltage range of the control device during operation as a fixed output voltage and provides the electrical power required by the control device available at the first supply voltage output. Furthermore, the first voltage regulator is designed for connection to the supply voltage source such that the voltage of the supply voltage source lies in a supply voltage range of the first voltage regulator.

Usually, measuring devices, and thus, also electrical function groups, must meet functional safety requirements. Functional safety of a system, such as the measuring device or the electrical function group, refers to the part of the safety of the system that depends on the intended function of the system and is regulated, for example, in the IEC 61508 series of standards. This series of standards requires, for example, the safe control of detected failures in a system and the transition of the system to a safe state.

Such a failure is, for example, the occurrence of an overvoltage at the first supply voltage input of the first voltage regulator, wherein the overvoltage is suitable for impairing the intended function of the electrical function group. It is known from the prior art to bring the function group into a safe state, namely the off state, for example in that the supply voltage source is switched off or the first supply voltage input is short-circuited via a current limit. However, this electrical function group is then no longer in operation, i.e., has failed, and cannot report the error to a receiver.

SUMMARY OF THE INVENTION

The object of the present invention is therefore to provide an electrical function group and a measuring device with an electrical functional group, in which the intended function is maintained even in the event of a failure without impairing the functional safety.

According to a first teaching, the invention relates to an electrical function group in which the described object is achieved. The electrical function group according to the invention is initially and essentially wherein the function group has a second voltage regulator with a second supply voltage input and a second supply voltage output. This second voltage regulator is designed to be connected to the supply voltage source via the second supply voltage input and to supply the first voltage regulator and the control device via the second supply voltage output. For this, the second supply voltage output of the second voltage regulator and the first supply voltage input of the first voltage regulator are electroconductively connected to one another.

The second voltage regulator is thereby designed to supply the first voltage regulator and the control device with electrical power via the second supply voltage output such that, during operation, it generates a second supply voltage within the supply voltage range of the first voltage regulator as a fixed output voltage and provides the electrical power required by the first voltage regulator and the control device available at the second supply voltage output. Furthermore, the second voltage regulator is designed for connection to the supply voltage source such that the voltage of the supply voltage source lies in a supply voltage range of the second voltage regulator.

The electrically conductive connection, on the one hand, of the second supply voltage output of the second voltage regulator and the first supply voltage input of the first voltage regulator and, on the other hand, of the first supply voltage output of the first voltage regulator and the supply voltage input of the control device means that the second voltage regulator, the first voltage regulator and the control device are connected electrically in series. Thus, during operation of the electrical function group, the second voltage regulator draws the power for its own operation and for operation of the first voltage regulator and the control device via the second supply voltage input of the supply voltage source, wherein the second supply voltage is present at the second supply voltage output of the second voltage regulator. Accordingly, the first voltage regulator draws the power for its own operation and for operation of the control device via the first supply voltage input of the second voltage regulator, wherein the first supply voltage is present at the first supply voltage output of the first voltage regulator. Finally, the control device draws the power from the first voltage regulator via the supply voltage input for its own operation.

A voltage regulator, such as the first voltage regulator or the second voltage regulator, for example, is a switching regulator or a linear regulator. Preferably, at least one of the two voltage regulators is a linear regulator. On the one hand, linear regulators are cheaper than switching regulators and, on the other hand, a voltage at the supply voltage output of a switching regulator, in contrast to a voltage at the supply voltage output of a linear regulator, has interference signals caused by switching operations of the switching regulator, which may impair an intended operation of the function group, and thus has to be reduced using a filter, wherein the filter causes further costs.

A linear regulator is either a series regulator or a shunt regulator. Preferably, at least one of the two voltage regulators is a series regulator, since the efficiency of a series regulator is higher than that of a shunt regulator. In the case of a series regulator, for operation, a voltage at the supply voltage input must be at least a minimum differential voltage greater than a voltage to be generated and present at the supply voltage output. Accordingly, the power loss in the series regulator is proportional to the differential voltage. The power loss is dissipated as heat, for which the series regulator is designed. Therefore, conventional series regulators are not suitable here, but low-dropout series regulators are. In contrast to a conventional series regulator, a low-dropout series regulator has a lower minimum differential voltage between the supply voltage input and the supply voltage output which is necessary for operation. This makes it possible to lower a voltage at the supply voltage input, whereby a power loss in the low-dropout series regulator is lower than in a conventional series regulator.

Preferably, both the first voltage regulator and the second voltage regulator are series regulators, in particular low-dropout series regulators. If the two voltage regulators are low-dropout series regulators, a voltage provided by the supply voltage source can be reduced in comparison to conventional series regulators, which reduces the power loss in the first and in particular also in the second voltage regulator. The power loss decreases in particular in the second voltage regulator, since this not only, like the first voltage regulator, provides the power for the control device, but also the power for the first voltage regulator.

The electrical function group according to the invention has the advantage over electrical function groups known from the prior art in that the intended function of the function group is maintained even in the case of a failure, such as an overvoltage, without compromising the functional safety of the function group. This is achieved in that, in addition to the first voltage regulator, a second voltage regulator is present and the first voltage regulator and the second voltage regulator are connected in series with one another. By using not only one voltage regulator but by using two voltage regulators, a voltage difference between the supply voltage source and the supply voltage range of the control device is no longer imposed on a single voltage regulator, but distributed among two voltage regulators. As a result, the sensitivity of the electrical function group to overvoltages is reduced compared to the prior art.

It is provided in a first design of the electrical function group according to the invention that the first voltage regulator is designed such that, in the event of failure of the first voltage regulator, the first supply voltage input and the first supply voltage output are short-circuited with one another. In this design, not only the first supply voltage is set at the first supply voltage output of the first voltage regulator such that the first supply voltage is located in the supply voltage range of the controller, but also the second supply voltage is set at the second supply voltage output of the second voltage regulator such that the second supply voltage is located in the supply voltage range of the control device. Thus, when the first voltage regulator fails, the control device is supplied with electrical power from the supply voltage source by the second voltage regulator via the short-circuited first voltage regulator.

In a further development of the above-described design, it is provided that the first voltage regulator is designed such that an overvoltage at the first supply voltage input causes the failure of the first voltage regulator. Thus, an overvoltage at the first supply voltage input of the first voltage regulator causes the first supply voltage input and the first supply voltage output to be short-circuited electroconductively with one another. As a result, the intended function of the function group is maintained even in the event of a failure caused by an overvoltage at the first supply voltage input, without impairing the functional safety.

In a design of the electrical function group, in which the first voltage regulator is designed such that, in the event of failure of the first voltage regulator, the first supply voltage input and the first supply voltage output are short-circuited with one another, it is provided that the control device monitors a first monitoring voltage at the supply voltage input of the control device and assigns a change in the first monitoring voltage to the failure of the first voltage regulator. If the first voltage regulator fails, preferably the first voltage regulator is designed such that an overvoltage at the first supply voltage input causes the failure of the first voltage regulator, then the first supply voltage is no longer present at the supply voltage input of the control device, but rather the second supply voltage. For this, the control device is designed to monitor the first monitoring voltage at the supply voltage input of the control device. Preferably, such a change in the first monitoring voltage is reported to a control system.

In a further design of the electrical function group according to the invention, it is provided that the second voltage regulator is designed such that, in the event of failure of the second voltage regulator, the second supply voltage input and the second supply voltage output are short-circuited with one another. In this design, the supply voltage range at the first supply voltage input of the first voltage regulator is selected such that safe operation of the first voltage regulator is ensured both with the second supply voltage at the second supply voltage output of the second voltage regulator and with the voltage of the supply voltage source. Thus, when the second voltage regulator fails, the control device is supplied with electrical power from the supply voltage source via the short-circuited second voltage regulator by the first voltage regulator.

A voltage regulator is designed to short-circuit its supply voltage input with its supply voltage output in the event of a failure when, in the case of a large number of these voltage regulators, the short-circuit is formed even with only a few of these voltage regulators in the event of a failure.

In a further development of the design described above, it is provided that the second voltage regulator is designed such that an overvoltage at the second supply voltage input causes the failure of the second voltage regulator. Thus, an overvoltage at the second supply voltage input of the second voltage regulator causes the second supply voltage input and the second supply voltage output to be electroconductively short-circuited to one another. As a result, the intended function of the function group is maintained even in the event of a failure due to an overvoltage at the second supply voltage input, without impairing the functional safety.

In one design of the electrical function group, in which the second voltage regulator is designed such that in the event of failure of the second voltage regulator, the second supply voltage input and the second supply voltage output are short-circuited to one another, it is provided that the control device, during operation, monitors a second monitoring voltage at the first supply voltage input of the first voltage regulator and assigns a change in the second monitoring voltage to the failure of the second voltage regulator. If the second voltage regulator fails, preferably the second voltage regulator is designed such that an overvoltage at the second supply voltage input causes the failure of the second voltage regulator, then the second supply voltage is no longer applied to the first supply voltage input of the first voltage regulator, but the voltage of the supply voltage source. For this, the control device is designed to monitor the second monitoring voltage at the first supply voltage input of the first voltage regulator. Preferably, such a change of the second monitoring voltage is reported to a control system.

It is provided in another design that, during operation, the control device monitors a third monitoring voltage at the second supply voltage input and assigns a change of the third monitoring voltage to an error. Preferably, such a failure of the third monitoring voltage is reported to a control system.

In a second teaching, the invention relates to a measuring device having at least one electrical function group of the type described. The measuring device according to the invention is initially essentially wherein the function group has a second voltage regulator with a second supply voltage input and a second supply voltage output. This second voltage regulator is designed to be connected to the supply voltage source via the second supply voltage input and to supply the first voltage regulator and the control device via the second supply voltage output. For this, the second supply voltage output and the first supply voltage input are electroconductively connected to one another.

One design of the measuring device according to the invention provides that the function group is designed according to one of the described designs and further developments.

The explanations in respect to the electrical function group according to the invention apply accordingly to the measuring device having at least one electrical function group and vice versa.

In detail, there is a plurality of possibilities for designing and further developing the electrical function group according to the invention and the measuring device according to the invention. For this, reference is made to the following description of a preferred embodiment in conjunction with the accompanying drawings.

DETAILED DESCRIPTION OF THE INVENTION

Figure 1:
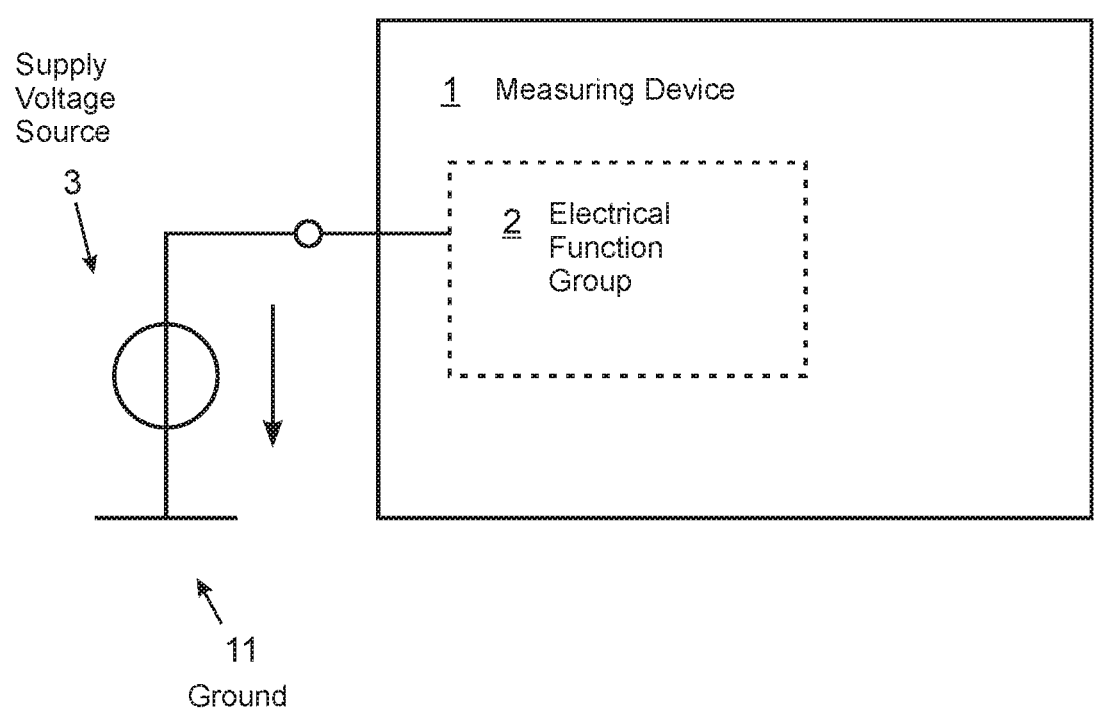
FIG. 1 shows an embodiment of a measuring device and
FIG. 2 shows an embodiment of an electrical function group.

FIG. 1 shows the measuring device 1 with the electrical function group 2. The measuring device 1, and thus, the electrical function group 2 are electroconductively connected to the supply voltage source 3 for being supplied with electrical power.

Figure 2:
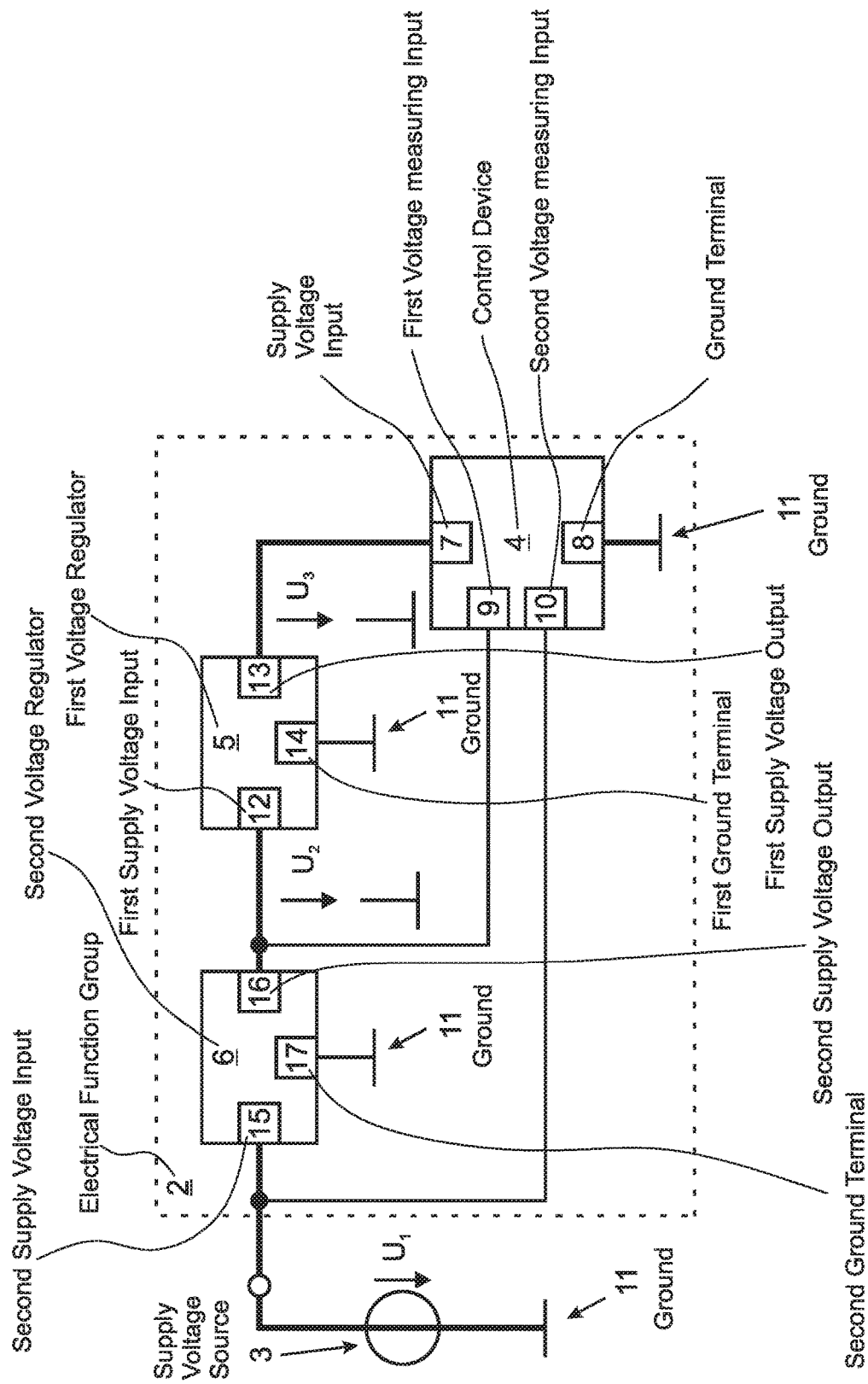

FIG. 2 shows the essential elements of the electrical function group 2. The function group 2 has a control device 4, a first voltage regulator 5 and a second voltage regulator 6.

Presently, the control device 4 is a microcontroller and has a supply voltage input 7, a ground terminal 8, a first voltage measuring input 9 and a second voltage measuring input 10. For operation, the control device 4 requires the input of electrical power via the supply voltage input 7. In order to ensure safe operation of the control device 4, a voltage present at the supply voltage input 7 when the electrical power is supplied must be within the supply voltage range of 2.7 V to 3.6 V. The ground terminal 8 is connected to ground 11.

Here, both the first voltage regulator 5 and the second voltage regulator 6 are low-dropout series regulators. Thus, the voltage regulator 5 contains the first supply voltage input 12, the first supply voltage output 13 and the first ground terminal 14. Accordingly, the second voltage regulator 6 has the second supply voltage input 15, the second supply voltage output 16 and the second ground terminal 17. Since these are low-dropout series regulators, a voltage present at the first supply voltage input 12 or at the second supply voltage input 15 must only be at least 200 mV higher than a voltage to be generated at the first supply voltage output 13 or at the second supply voltage output 16. The supply voltage source 3 and the second supply voltage input 15 are electroconductively connected to one another. Furthermore, the second supply voltage output 16 and the first supply voltage input 12 are electroconductively connected to one another. The first supply voltage output 13 and the supply voltage input 7 are also electroconductively connected to one another. The control unit 4, the first voltage regulator 5 and the second voltage regulator 6 are, thus, connected in series. The first ground terminal 14 and the second ground terminal 17 are connected to ground 11. Preferably, the electrical connections mentioned are direct, that is, without further electrical components connected in series.

In error-free operation of the measuring device 1, a first supply voltage $U_1$ of 5 V generated by the supply voltage source 3 is present at the second supply voltage input 15. The second voltage regulator 6 is set up to generate a second supply voltage $U_2$ of 3.3 V and to provide it at the second supply voltage output 16. For this, a voltage present at the second supply voltage input 15 must be at least 200 mV higher than the second supply voltage $U_2$, i.e., at least 3.5 V, and be within the supply voltage range of the second voltage regulator 6. Both are given here. The first voltage regulator 5 is set up to generate a third supply voltage $U_3$ of 3.0 V and to make it available at the first supply voltage output 13. For this, a voltage present at the first supply voltage input 12 must be at least 200 mV higher than the third supply voltage $U_3$, i.e., at least 3.2 V, and be within the supply voltage range of the first voltage regulator 5. Both are also given here, in particular, the first supply voltage $U_1$ of 5 V and the second supply voltage $U_2$ of 3.3 V, are within the supply voltage range. The already mentioned supply voltage range of the control device 4 comprises the second supply voltage $U_2$ of 3.3 V and the third supply voltage $U_3$ of 3.0 V, but not the first supply voltage $U_1$ of 5 V.

The supply voltage source 3 supplies power via the second supply voltage input 15, which is required by the second voltage regulator 6 for its own operation and for supply of the first voltage regulator 5 and the control device 4. Accordingly, the second voltage regulator 6 supplies, via the first supply voltage input 12, the power required by the first voltage regulator 5 for its own operation and for supplying the control device 4. Finally, the first voltage regulator 5 supplies—via the supply voltage input 7 of the control device 4—the power required by the control device 4 for operation. In this case, the first voltage regulator 5 and the second voltage regulator 6 are designed to dissipate the heat which arises during supply of the aforementioned power when the voltage present at the respective supply voltage input lies within the supply voltage range.

Both the first voltage regulator 5 and the second voltage regulator 6 are designed such that an overvoltage at the first supply voltage input 12 or at the second supply voltage input 15 causes a failure of the first voltage regulator 5 or the second voltage regulator 6 such that the first voltage regulator 5 electroconductively short-circuits the first supply voltage input 12 and the first supply voltage output 13 with one another or, respectively, the second voltage regulator 6 electroconductively short-circuits the second supply voltage input 15 and the second supply voltage output 16 with one another.

The control device 4 is designed to monitor a first monitoring voltage at the supply voltage input 7, a second monitoring voltage at the first voltage measuring input 9 and a third monitoring voltage at the second voltage measuring input 10. For this, firstly the first voltage measuring input 9 is electroconductively connected to the second supply voltage output 16 and secondly the second voltage measuring input 10 is electroconductively connected to the second supply voltage input 15. Thus, during operation, the control device 4 monitors the third supply voltage $U_3$ at the supply voltage input 7, the second supply voltage $U_2$ at the first voltage measuring input 9 and the first supply voltage $U_1$ at the second voltage measuring input 10. Further, the control device 4 is set up to assign a change of the first monitor voltage to the failure of the first voltage regulator 5 and to assign a change in the second monitoring voltage to the failure of the second voltage regulator 6 and to assign a change in the third monitoring voltage to a error of the supply voltage source 3.

A change in the first monitoring voltage occurs when the first voltage regulator 5 fails and the first voltage regulator 5 short-circuits the first supply voltage input 12 with the first supply voltage output 13. As a result, the first monitoring voltage changes from 3 V to 3.3 V. A change in the second monitoring voltage arises in that the second voltage regulator 6 shorts the second supply voltage input 15 with the second supply voltage output 16 in the event of a failure. As a result, the second monitoring voltage changes from 3.3 V to 5 V.

Thus, the intended function of the electrical function group 2 is ensured even in the case of an error due to the failure of the first voltage regulator 5 or the second voltage regulator 6, without impairing the functional safety, wherein the error can be caused in particular by an overvoltage.

What is claimed is:

1. An electrical function group, comprising:
   a control device having a supply voltage input,
   a first voltage regulator, and
   a second voltage regulator
   wherein the first voltage regulator has a first supply voltage input and a first supply voltage output and is adapted for being connected to a supply voltage source via the first supply voltage input and to supply the control device via the first supply voltage output,
   wherein the first supply voltage output and the supply voltage input of the control device are connected to one another,
   wherein the second voltage regulator has a second supply voltage input and a second supply voltage output,
   wherein the second voltage regulator adapted for being connected to the supply voltage source via the second supply voltage input and to supply the first voltage regulator and the control device via the second supply voltage output,
   wherein the second supply voltage output and the first supply voltage input are electrically connected to one another,
   wherein, in the event of failure of the first voltage regulator, the first voltage regulator is adapted to cause the first supply voltage input and the first supply voltage output to be short-circuited with one another, and
   wherein the control device is adapted to monitor a first monitoring voltage at the supply voltage input of the control device and to assign a change in the first monitoring voltage to failure of the first voltage regulator.

2. The electrical function group according to claim 1, wherein the first voltage regulator is adapted to fail when an overvoltage occurs at the first supply voltage input, thereby producing said short-circuiting of the first supply voltage input and the first supply voltage output.

3. The electrical function group according to claim 1, wherein, in the event of failure of the second voltage regulator, the second voltage regulator is adapted to cause the second supply voltage input and the second supply voltage output to be short-circuited with one another.

4. The electrical function group according to claim 3, wherein the control device is adapted to monitor a second monitoring voltage at the first supply voltage input and to assign a change in the second monitoring voltage to failure of the second voltage regulator.

5. The electrical function group according to claim 1, wherein the second voltage regulator is adapted to fail when an overvoltage occurs at the first supply voltage input, thereby producing said short-circuiting of the second supply voltage input and the second supply voltage output.

6. The electrical function group according to claim 1, wherein, during operation, the control device is adapted to monitor a third monitoring voltage at the second supply voltage input and to assign a change of the third monitoring voltage to an error.

7. A measuring device, comprising:
   means for measuring a property to be monitored and
   an electrical function group, wherein the electrical function group comprises:
   a control device having a supply voltage input,
   a first voltage regulator, and
   a second voltage regulator
   wherein the first voltage regulator has a first supply voltage input and a first supply voltage output and is adapted for being connected to a supply voltage source via the first supply voltage input and to supply the control device via the first supply voltage output, wherein the first supply voltage output and the supply voltage input of the control device are connected to one another, wherein the second voltage regulator has a second supply voltage input and a second supply voltage output, wherein the second voltage regulator is adapted for being connected to the supply voltage source via the second supply voltage input and to supply the first voltage regulator and the control device via the second supply voltage output, wherein the second supply voltage output and the first supply voltage input are electrically connected to one another, wherein, in the event of failure of the first voltage regulator, the first voltage regulator is adapted to cause the first supply voltage input and the first supply voltage output to be short-circuited with one another, and wherein the control device is adapted to monitor a first monitoring voltage at the supply voltage input of the control device and to assign a change in the first monitoring voltage to failure of the first voltage regulator.

8. The measuring device according to claim 7, wherein the means for measuring is adapted for measuring at least one of flow, level, temperature, pressure, gas or steam.

9. An electrical function group, comprising:
a control device having a supply voltage input,
a first voltage regulator, and
a second voltage regulator wherein the first voltage regulator has a first supply voltage input and a first supply voltage output and is adapted for being connected to a supply voltage source via the first supply voltage input and to supply the control device via the first supply voltage output, wherein the first supply voltage output and the supply voltage input of the control device are connected to one another, wherein the second voltage regulator has a second supply voltage input and a second supply voltage output, wherein the second voltage regulator adapted for being connected to the supply voltage source via the second supply voltage input and to supply the first voltage regulator and the control device via the second supply voltage output, wherein the second supply voltage output and the first supply voltage input are electrically connected to one another, and wherein, in the event of failure of the first voltage regulator, the first voltage regulator is adapted to cause the first supply voltage input and the first supply voltage output to be short-circuited with one another.

10. The electrical function group according to claim 9, wherein the first voltage regulator is adapted to fail when an overvoltage occurs at the first supply voltage input, thereby producing said short-circuiting of the first supply voltage input and the first supply voltage output.

11. The electrical function group according to claim 9, wherein the second voltage regulator is adapted to fail when an overvoltage occurs at the first supply voltage input, thereby producing said short-circuiting of the second supply voltage input and the second supply voltage output.

* * * * *